US007769784B2

(12) United States Patent
Chagoly et al.

(10) Patent No.: US 7,769,784 B2
(45) Date of Patent: Aug. 3, 2010

(54) SYSTEM FOR AUTONOMICALLY IMPROVING PERFORMANCE OF ENTERPRISE JAVA BEANS THROUGH DYNAMIC WORKLOAD MANAGEMENT

(75) Inventors: Bryan Christopher Chagoly, Austin, TX (US); Scott Stephen Dickerson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 11/044,464

(22) Filed: Jan. 27, 2005

(65) Prior Publication Data

US 2006/0167892 A1 Jul. 27, 2006

(51) Int. Cl.
*G06F 7/00* (2006.01)
*G06F 17/30* (2006.01)
(52) U.S. Cl. ..................................................... 707/803
(58) Field of Classification Search ........................ None
See application file for complete search history.

(56) References Cited

U.S. PATENT DOCUMENTS

| 6,792,460 | B2 * | 9/2004 | Oulu et al. | 709/224 |
|---|---|---|---|---|
| 6,859,834 | B1 * | 2/2005 | Arora et al. | 709/227 |
| 7,543,273 | B2 * | 6/2009 | Chow et al. | 717/118 |
| 2004/0064552 | A1 * | 4/2004 | Chong et al. | 709/224 |
| 2005/0149940 | A1 * | 7/2005 | Calinescu et al. | 718/104 |
| 2005/0163047 | A1 * | 7/2005 | McGregor et al. | 370/229 |
| 2006/0015512 | A1 * | 1/2006 | Alon et al. | 707/100 |

FOREIGN PATENT DOCUMENTS

WO WO 02/079973 10/2002

OTHER PUBLICATIONS

Xu et al., "Migration of Enterprise JavaBeans with ProActive Interposition Objects", ACM SIGPLAN Notices, vol. 38(8), Aug. 2003, pp. 22-28.
Liu, "Performance and Scalability Measurement of COTS EJB Technology", School of Information Technologies, University of Sydney, Australia, pp. 1-8.
Liu et al., "Layered Queueing Models for Enterprise JavaBean Applications", Proceedings Fifth IEEE International Enterprise Distributed Object Computing Conference, pp. 174-178, Published Los Alamitos, CA, USA, 2001.
Amza et al., "Specification and Implementation of Dynamic Web Site Benchmarks", 2002 IEEE International Workshop on Workload Characterization, pp. 3-13, Published Piscataway, NJ, USA, 2002.

* cited by examiner

*Primary Examiner*—Neveen Abel Jalil
*Assistant Examiner*—Raheem Hoffler
(74) *Attorney, Agent, or Firm*—Yee & Associates, P.C.; Jeffrey S. LaBaw

(57) ABSTRACT

A system, method, and computer program for dynamically changing the weightings used by a workload distribution program to distribute Enterprise JavaBeans among a group of application servers handling EJBs. The changes are made in response to real-time measurements of the performance of EJBs involved in e-business transactions based on the dynamic insertion of monitors within the EJBs to measure their class and method performance from within the J2EE server. The performance data can be tracked for specific users or specific types of transactions, so that the servers are weighted for optimal handling of the most critical EJBs.

19 Claims, 4 Drawing Sheets

SYSTEM FOR AUTONOMICALLY IMPROVING PERFORMANCE OF ENTERPRISE JAVA BEANS THROUGH DYNAMIC WORKLOAD MANAGEMENT

BACKGROUND OF THE INVENTION

1. Technical Field

This application is generally directed to improving the performance in a multi-server environment. More specifically, this application is directed to improving the workload management of EJBs hosted in a clustered J2EE environment.

2. Description of Related Art

An Internet provider of information and services must contend with numerous problems. They must provide services to clients while simultaneously protecting themselves from inadvertent or malicious intrusions into their databases. They must often provide a guaranteed, specific level of quality, e.g., response time, while at the same time keeping overhead low so that a profit can be made. Management programs can monitor and control processes within the computer system to optimize the usage of components and capabilities in a constantly changing environment. Providing online information is an evolving field and not all areas are optimized. For example, in systems that use multiple servers, it is important to spread the load among the servers so that the work can be optimally processed, with no server sitting idle while other servers are busy. Load balancing is a known method of balancing the workload among a plurality of servers. Yet all servers are not created equal. To this end, each server can have a weighting factor, so that a faster server can be given more work than a slower server.

Choosing the correct approach in determining these server weights is a critical decision, because inaccurate weights can adversely affect the performance of the load balancing. Past approaches to determining these server weights have utilized a "pinging" approach to measure server response, an indicia of server load. One limitation of "pinging" approaches to load balancing is that they generate additional traffic on the monitored application, and that they represent synthetic user performance not real-user performance. Another approach is listening at the packet and port level at a centralized server to measure server response for each request. While this approach works well for web traffic that uses the HyperText Transfer Protocol (HTTP), Enterprise Java Beans (EJBs) utilize Internet Inter-ORB Protocol (IIOP) requests to service business transactions. IIOP requests have some critical differences that limit the effectiveness of these traditional approaches.

When hosted within a clustered Java 2 Platform Enterprise Edition (J2EE) business environment, clients of EJBs issue a Java Naming and Directory Interface (JNDI) lookup directly to their local configuration manager. The configuration manager, based on the server weights for each EJB container, determines which EJB reference to return to the client. Once the initial request to the EJB is gained, EJBs use transient ports to satisfy their actual business logic. Since these ports are transient, it makes the port-listening approach to load balancing difficult.

Furthermore, rather than treat the response times of all EJBs of a particular server equivalently, as is done by the "pinging" method, it would be even more beneficial to be able to narrow the focus of the response times measured to the performance of particular business-critical EJBs or the response times that particular users are receiving. In the HTTP load-balancing arena, cookies are typically used to identify and prioritize important users during load balancing. In the EJB space, a solution to identify and prioritize the experience of particular EJB users is needed.

Therefore, it would be desirable for the system to be able to change the weightings for a plurality of servers to dynamically manage the EJB workload.

SUMMARY OF THE INVENTION

The present invention provides for a system, method, and computer program to dynamically change the weights of a group of application servers handling Enterprise JavaBeans. The changes are made in response to real-time measurements of the performance of EJBs involved in transactions, using dynamic insertion of monitors within the EJBs to determine their class and method and measure performance from within the J2EE server. The performance data can be tracked for specific users or specific types of transactions, so that the servers are weighted for optimal handling of the most critical EJBs.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

An embodiment of the invention will now be disclosed with reference to the drawings. To understand the context of this invention, it is helpful to understand that when a request to a website is received, the response is often not handled by a single program; rather a series of programs is used to perform the requested tasks. In the presently preferred embodiment, J2EE is used. J2EE is a platform-independent, Java-centric environment from Sun Microsystems for developing, building and deploying Web-based enterprise applications online. The J2EE platform consists of a set of services, Application Program Interfaces (APIs), and protocols that provide the functionality for developing multi-tiered, Web-based applications.

Figure 1:
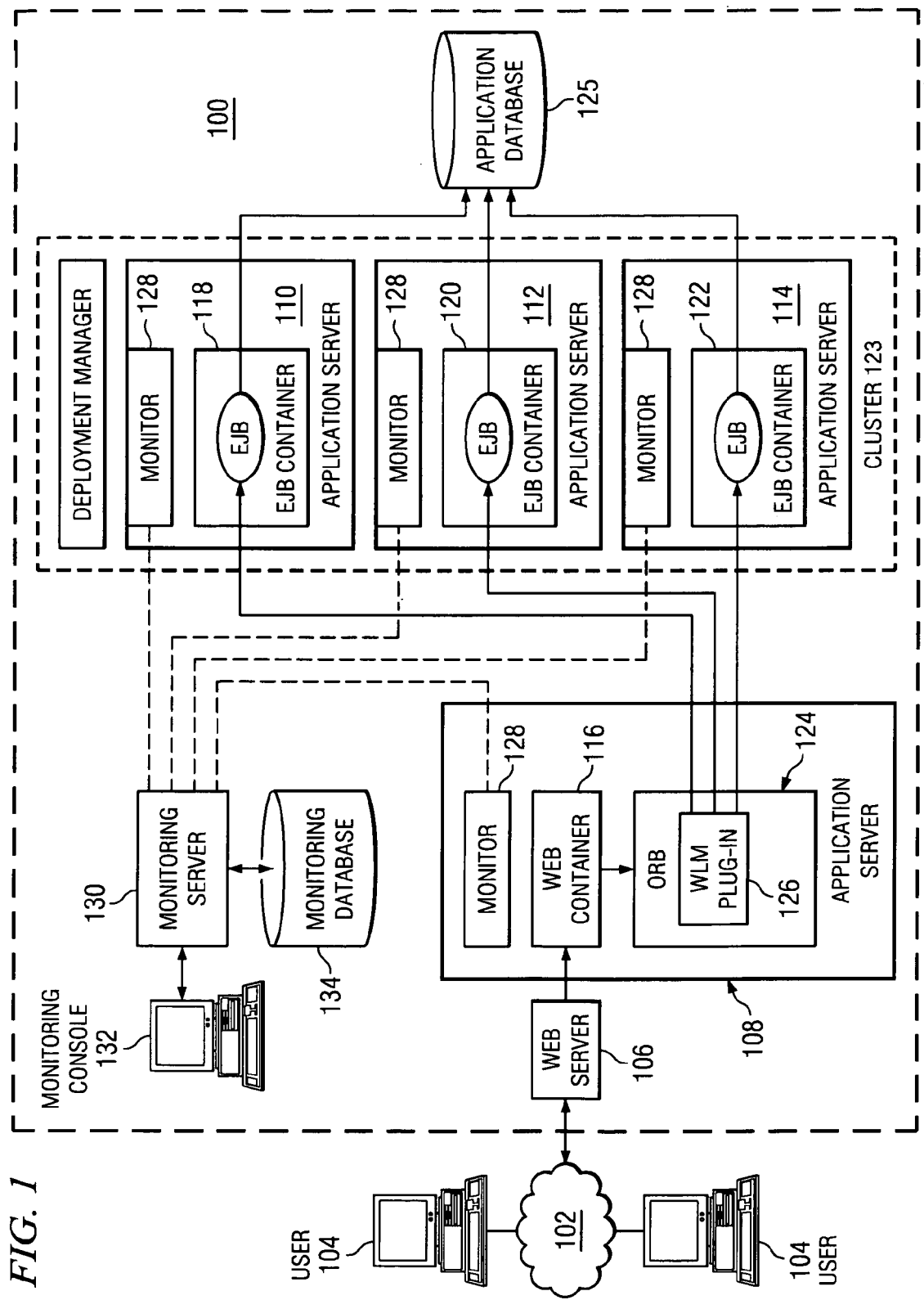
FIG. 1 depicts a high-level diagram of an information provider connected to the Internet, according to an embodiment of the invention.

With reference to FIG. 1, a computer system 100 for a business entity is connected to the Internet 102 in order to provide computer services online. The website of the business entity is accessible to various online users 104. Within computer system 100, six servers 106, 108, 110, 112, 114, 130 are shown. Server 106 is configured as a web server, while each of servers 108, 110, 112, 114 is configured as an application server. The configuration shown reflects that the volume of requests to the database is large, so that it has become advantageous to separate different parts of the job to physically different machines, with web server 106 on a separate machine from the other servers. Database 124 is not directly accessible by users 104 or web server 106, which are more easily corrupted, but is accessible to application servers 110, 112, 114.

At the level of web server 106, J2EE supports pure HTML, as well as Java applets or applications. It relies on Java Server Pages and servlet code to create HTML or other formatted data for the client. The application servers have been separated into two groups: application server 108, which contains web container 116 and initiates the execution of servlets, and cluster 123 containing application servers 110, 112, 114, each of which contains an EJB container 118, 120, 122 and each of which initiates the execution of EJBs.

EJBs typically provide the actual business logic of an e-business transaction. An EJB container provides functions such as threading, concurrency, security and memory management. Either a servlet or a standalone Java program can be a client of an EJB. The client, e.g., a servlet running in Web container 116 on server 108, is typically concerned with the presentation of the data to the end user. For example, to book an airline ticket, the servlet would be responsible for generating the HTML pages for the user, but would make a call to an EJB to actually create the ticket in the database. In smaller systems, a single web container and a single EJB container may reside on the same machine, in which case, the use of the disclosed workload management of EJBs is unnecessary.

Clients that utilize EJBs retrieve a reference to an EJB using a lookup request from a JNDI repository. A JNDI repository is analogous to a Directory Name Service (DNS) for EJBs; it associates a name or text string with a particular EJB class. After passing a string identifying the EJB requested to the JNDI repository, the EJB client is granted a reference to an EJB object called a stub. The EJB client then proceeds to call the business logic of this EJB on the stub it has retrieved. Using Remote Method Invocation-Internet Inter-ORB Protocol (RMI-IIOP) and/or Simple Object Access Protocol (SOAP), each business logic request is forwarded across transient ports to the EJB server. The actual implementation classes of the EJBs run their business logic in the EJB server, such as exemplary servers 110, 112, 114 in cluster 123. The result of the method is then returned to the EJB client.

In a preferred embodiment of a clustered EJB environment, the JNDI lookup request is issued directly to the configuration manager on the local host, e.g., application server 108, which uses the server weighting factors stored in the server configuration file to determine which host shall receive the specific EJB. These weighting factors show the number of EJBs to send to a given server in relation to the number of EJBs to the other servers. For example, servers A, B, and C have respective weightings of 4, 3, and 2. EJBs are distributed in a round-robin fashion, but taking the weightings into account, such that they are distributed to A, B, C, A, B, C, A, B, A, then this cycle starts again. The WorkLoad Management (WLM) program uses WLM plug-in 126 in the Object Request Broker (ORB) 124 to dispatch the EJB load to application servers 110, 112, 114, in accordance with the weighting factors, such that a server with a higher weight will receive proportionally more of the EJB requests. It is important to note that the business logic is not actually performed at lookup time, so it is insufficient to adjust these server weights based on the performance of the lookup alone. According to this invention, monitor programs 128 are installed on the EJB servers 108, 110, 112, 114 to monitor the performance of the business logic of the EJBs and update the weights that the configuration manager is using. Monitoring programs 128 can be configured to perform various monitoring tasks, as required by the system, while monitoring server 130 is connected to control monitoring programs 128. The results of the monitoring can be saved to monitoring database 134, while monitoring console 132 provides an interface to human oversight of system 100.

Figure 2:
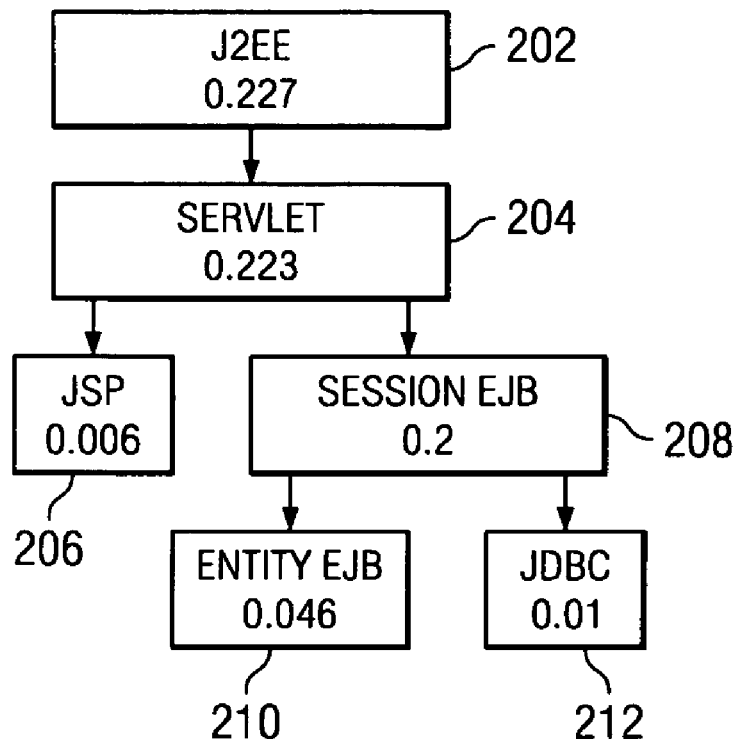
FIG. 2 depicts the programs invoked by an exemplary user request.

With reference to FIG. 2, an exemplary user request is representatively shown, along with the collected data for the time spent in the different programs. A J2EE program 202 receives a user request for information from the database. After decoding the request, J2EE initiates a servlet 204 in Web container 116. The servlet 204 calls Session EJB 206. Session EJB 206, in turn, calls Entity EJB 210. When Entity EJB 210 completes, Session EJB calls Java DataBase Connectivity (JDBC) 212. After JDBC completes, Session EJB 206 completes and returns to servlet 204. Servlet 204 then calls Java Servlet Page (JSP) 208 to display the results. As shown in this figure, the time spent in J2EE 202, which reflects the total time spent responding to this request, is 0.227 seconds, of which a total of 0.223 seconds was recorded in servlet 204. Of the 0.223 seconds spent in servlet 204, 0.2 seconds was spent in session EJB 206 and 0.006 seconds was spent in JSP 208, with the remaining time (0.017) spent in servlet 204 itself. Of the time spent in session EJB 206, 0.046 seconds was spent in entity EJB 210 and 0.01 seconds was spent in JDBC 212, with 0.144 second of the time spent in session EJB 206 itself.

Within each of the "nodes" shown in FIG. 2, the performance and availability of the EJBs is tracked at the method and class level. Using tokens, the system can be configured to only monitor performance of particular EJBs or EJBs that were called only by a particular user. A token 214 can be attached to the initial program 202 at its entry point and the token made available in turn to each additional program as it is called. Additional information about the use of tokens is available in an application owned by the assignee of the present application and having a user Ser. No. 10/971,472, which is hereby incorporated by reference.

Figure 3:
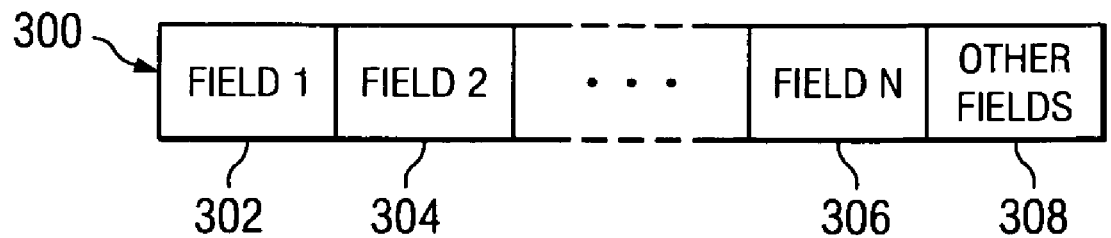
FIG. 3 depicts a token that is used to select records to monitor.

An exemplary token 300 is depicted in FIG. 3. In this example, token 300 includes several fields. Field 1 302 contains the configuration for monitoring a first policy component and occupies some arbitrary number of bytes. Field 2 304 contains the configuration for monitoring a second policy component. Field N 306 contains the configuration for monitoring an nth policy, and so on. Other fields 308 contain information unrelated to monitoring policy, if needed. In preferred embodiments, an absence of a token indicates the transaction should not be monitored. The configuration is preferably captured in policies, and one policy can be associated with one or more transactions. By adjusting the policies and associated transactions, transactions of an application can be monitored with great selectivity and a desired granularity. For example, one can choose to track the response times only of "star" customers who have been promised the best in response times. By collecting information and optimizing the system only for these customers, one gives the highest priority to the processing of their specific applications.

Figure 4:
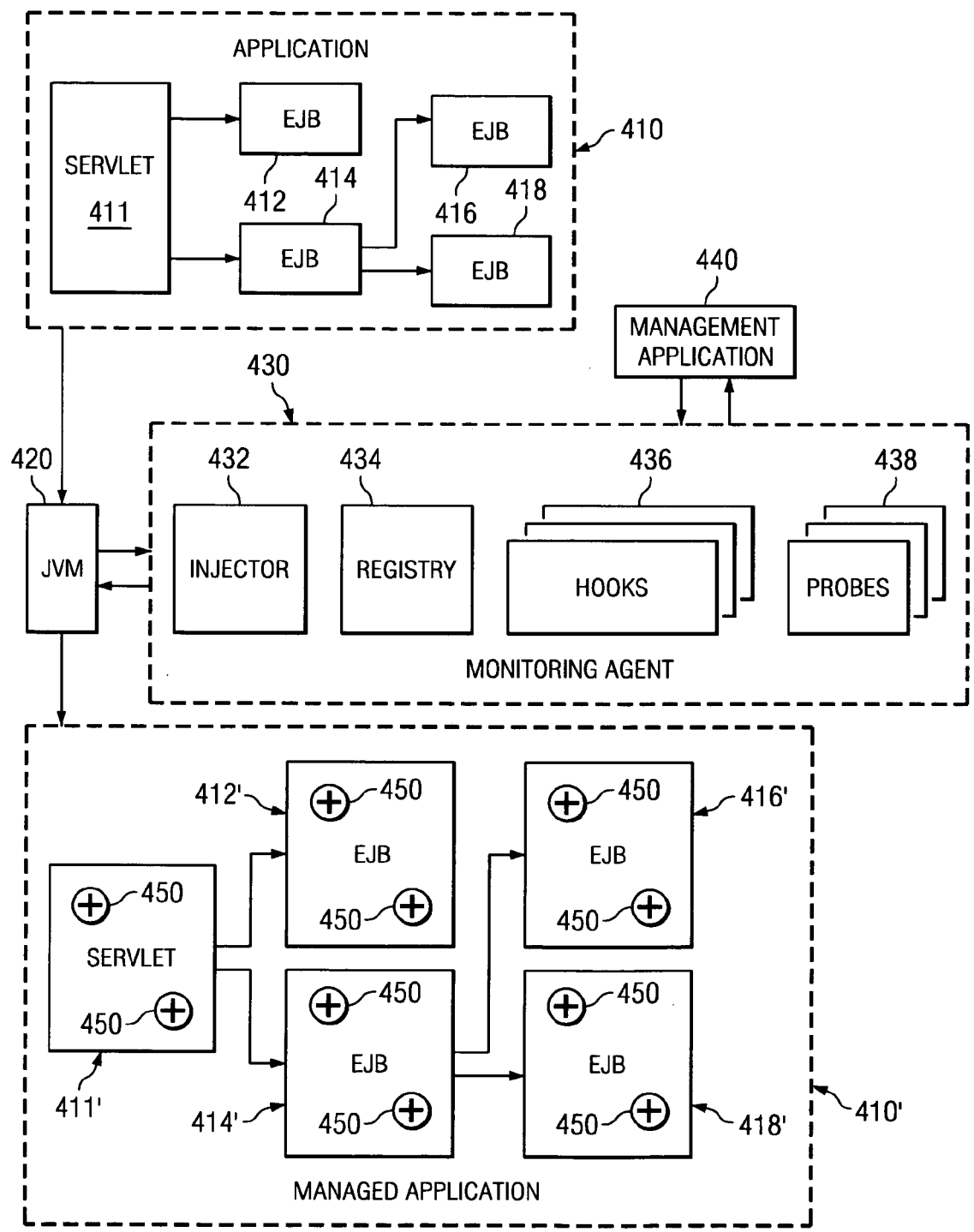
FIG. 4 depicts the relationship between the Java Virtual Machine (JVM), the monitoring agent, and a transaction running on the system.

With reference to FIG. 4, an overview is shown of the relationship between an application 410, a copy of the Java Virtual Machine (JVM) 420, and a monitoring agent 430, illustrating how monitoring can be performed without changing user code. A bi-directional interface exists between JVM 420 and monitoring agent 430. Monitoring agent 430 contains injector 432 (which injects byte codes or hooks into applications), registry 434 (which contains a registry of all enabled probes), hooks 436 (which contain the logic to manage the execution of probes), and probes 438. Probes can be enabled or disabled by management application 440. Exemplary application 410 contains servlet 411, which invokes Enterprise JavaBeans (EJBs) 412, 414. In turn EJB 414 invokes further EJBs 416, 418. When application 410 is compiled by the JVM, the interface between JVM 420 and monitoring agent 430 allows injector 432 to inject special byte codes 450 into the components 411, 412, 414, 416, 418 of application class 410 to form managed application 410'. Note that each of the components 411', 412', 414', 416', 418' of managed application 410' contains inserted byte codes 450. These byte codes 450 correspond to hooks 436; when managed application 410' executes, hooks 436 will interface with registry 434 and cause the desired probes 438 to execute.

Probes 438 are application components or plug-ins that run in the same process as the monitored component of the application (e.g., servlet, EJB, etc.). The probe defines pre- and post-enabled entry points accessible by the hook, as well as the special-case entry point postThrown. The hook invokes the pre-enabled entry point prior to the entry point of the application component being monitored. Immediately after the monitored application component has completed, the hook invokes the post- or postThrown-enabled entry point, depending on which is appropriate. The enabled entry point determines whether pre, post, or postThrown are invoked.

Based on the response times captured by the monitoring shown above, administrators can set thresholds on each method or class of the EJB. If the performance or availability of this method or class crosses its assigned threshold, a violation is received. Because this method uses tokens that are attached to the transactions at run time, known as Just-In-Time instrumentation, no changes are required to the customer application source code to report these performance and availability metrics.

Figure 5A:
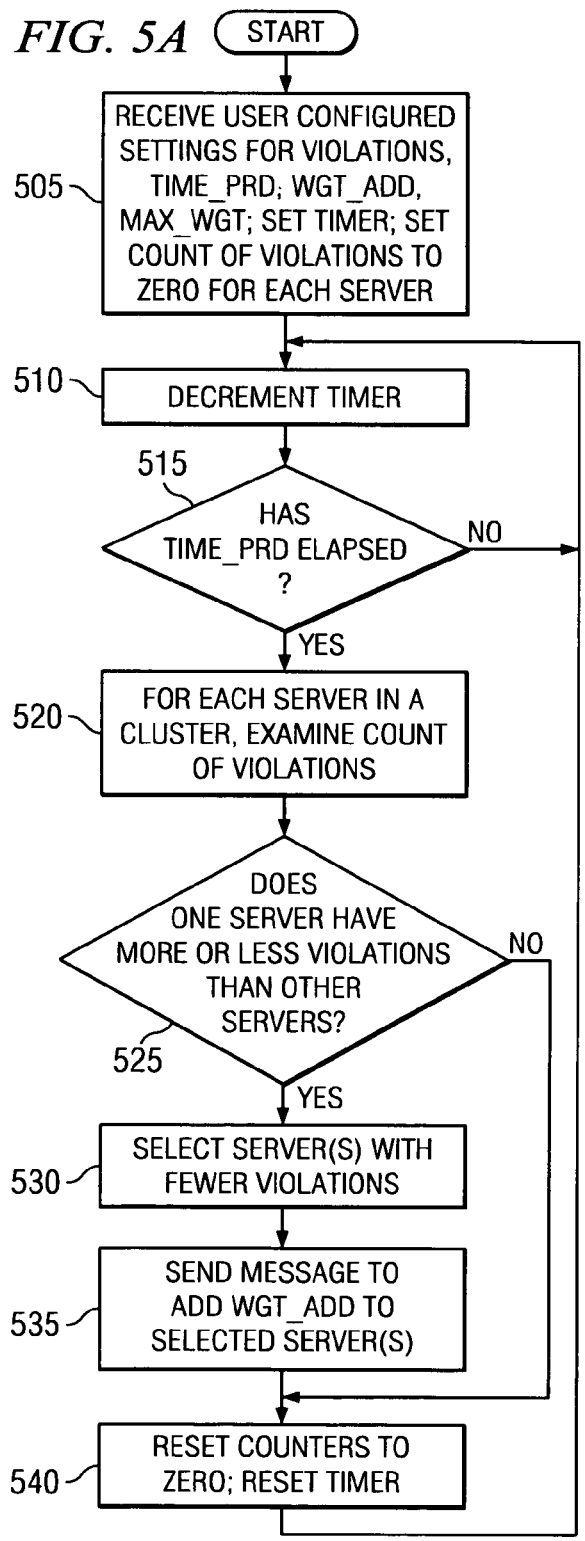
FIG. 5A shows a flowchart depicting the actions performed by the monitoring program according to an exemplary embodiment of the invention.
Figure 5B:
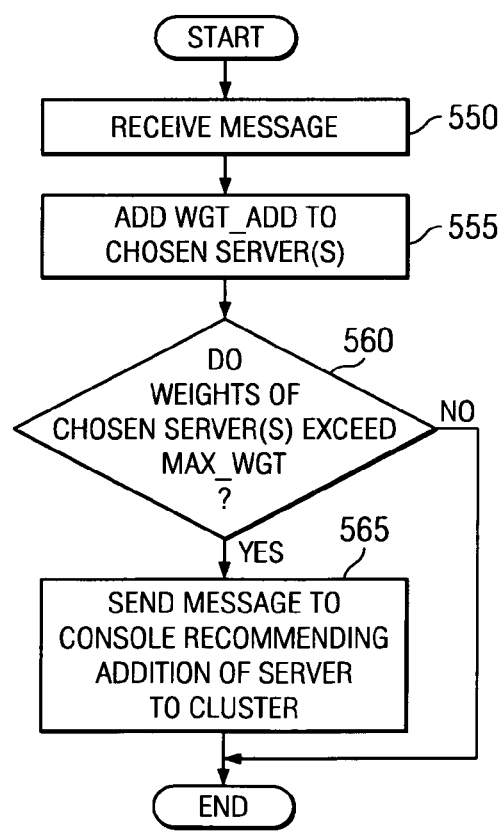
FIG. 5B shows a flowchart depicting the actions performed by the monitoring server according to an exemplary embodiment of the invention.

With reference to FIGS. 5A and 5B, flowcharts are shown depicting the actions performed by the monitoring program 128 and the monitoring server 132 respectively in order to utilize the information collected above, according to an exemplary embodiment of the invention. The flowchart begins with receiving several user-configured settings (step 505). These settings will have been entered on monitoring console 132 and saved in monitoring database 134, then passed along to monitor programs 128 as necessary. The settings include Violations, Time_prd, Wgt_add, and Max_wgt. Violations is a value of what constitutes a violation of the desired parameters for the EJBs. For example, the provider may have a service contract that specifies an average and a maximum response time. The parameter Violations can be set to reflect an EJB response time that is inconsistent with achieving the contract. Time_prd is a measure of how often the application servers having EJB containers should be checked. For example, if it is known that a problem currently exists in these servers, time_prd can be set to 5 minutes; as an ongoing check of the servers, hourly may be sufficient. Wgt_add refers to the amount by which a weighting factor can be changed in a single iteration; max_wgt refers to a maximum acceptable value for the weighting factors. As a final part of this step, a count of Violations is set to zero for each server and a timer is set to the value of Time_prd so that it can be used to count down the time. Those skilled in the art would recognize that other variables besides response time could be used to monitor the performance of the EJBs.

The timer is decremented by one (step 510); the comparison is made to determine if the desired time period has elapsed (step 515). The program will loop back to step 510 for as long as the time period has not elapsed. When the time period is up, the collected information is checked. For each of servers 118, 120, 122 in cluster 123, the program examines the number of violations for EJBs with the given time period (step 520). From this data, the program is able to determine if one server has significantly more or less violations than the other servers (step 525). If not, no adjustments are currently needed and the program skips to step 540. If, however, there is an imbalance, the program selects the server(s) that do not have any (or as many) violations (step 530). It is desirable to increase the weighting factor for the selected servers, since they have been better able to manage their load without problems; a message to increase their weighting factor by Wgt_add is sent to the monitoring server (step 535). Once this iteration is complete, counters are reset to zero and time_prd is reset to the designated value (step 540).

FIG. 5B shows the activity that follows in the monitoring server 130. The flow starts when the message is received in the monitoring server 130 (step 550). Using the information in the message, the value of Wgt_add is added to the selected server(s) (step 555). A determination is then made whether the new weight factors of the chosen servers exceed the value of Max_wgt (step 560). If so, a message is sent to monitoring console 132 that an additional server should be added to the cluster to improve performance (step 565); if Max_wgt has not been exceeded, this step is skipped. Once these steps are completed, the monitoring server has completed this task. When workload management program 126 next distributes EJBs, it will use the updated weighting factors.

Thus, the invention includes a computer system, method, and program for dynamically updating the weighting values for servers processing EJBs, according to real-time measurements of the system.

Notably, those of ordinary skill will realize that many variations are possible to the described embodiment of the invention without going outside the bounds of the claimed invention. For example, determination that the weightings need to be changed does not have to be made solely by comparing violations of user agreements. Rather, any reasonable method of determining the best settings for the weightings can be used. For example, the average time that EJBs spend in each server can be used to set a weighting value, such that servers that take longer receive lower weightings. The algorithm can also be applied to servlets, as well as to EJBs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of administering a cluster of application servers configured to run enterprise JavaBeans (EJBs), comprising the steps of:
   dividing a workload of EJBs among application servers of said cluster of application servers according to respective weighting values associated with said application servers of said cluster of application servers;
   monitoring a plurality of selected EJBs on said cluster of application servers and recording selected execution information for respective application servers of said cluster of application servers, wherein said monitoring comprises dynamically inserting monitors within each of said plurality of selected EJBs to monitor real-time performance of said selected EJBs;
   periodically comparing said selected execution information for said respective application servers of said cluster of application servers;
   upon detection of a given difference between execution information for said respective application servers of said cluster of application servers, dynamically changing at least one of said respective weighting values
   monitoring an occurrence of violations of execution limits by EJBs running on an application server of said cluster of application servers, wherein the periodically comparing; comprises periodically comparing respective numbers of violations for each application server of said cluster of application servers.

2. The method of claim 1, wherein said monitoring is performed by a plurality of monitoring programs, each of said plurality of monitoring programs running on an application server of said cluster of application servers.

3. The method of claim 1, wherein said monitoring further comprises determining an average time said plurality of selected EJBs spend in each application server of said cluster of application servers.

4. The method of claim 1, wherein said monitoring further comprises periodically checking for violations at an interval that is specified by user input.

5. The method of claim 1, wherein said dynamically changing at least one of said respective weighting values, comprises dynamically changing at least one of said respective weighting values by a first amount that is user-input.

6. The method of claim 1, wherein a monitoring server performs said dynamically changing at least one of said respective weighting values.

7. The method of claim 1, wherein said periodically comparing is performed at intervals set by a user.

8. The method of claim 1, further comprising sending a message to a console, noting that an additional server should be added to said cluster of application servers, responsive to one of said respective weighting values reaching a maximum value.

9. The method of claim 8, further comprising receiving said maximum value from a user.

10. The method of claim 1, wherein said selected EJBs are associated with specific customers.

11. The method of claim 1, wherein said monitoring is performed without change to user source code.

12. A data processing system comprising:
   a data processor coupled to a memory, wherein the data processor is operable for executing instructions in the memory to perform steps of:
   dividing a workload of EJBs among application servers of said cluster of application servers according to respective weighting values associated with said application servers of said cluster of application servers;
   monitoring a plurality of selected EJBs on said cluster of application servers and recording selected execution information for respective application servers of said cluster of application servers, wherein said monitoring comprises dynamically inserting monitors within each of said plurality of selected EJBs to monitor real-time performance of said selected EJBs;
   periodically comparing said selected execution information for said respective application servers of said cluster of application servers;
   upon detection of a given difference between execution information for said respective application servers of said cluster of application servers, dynamically changing at least one of said respective weighting values; and
   monitoring an occurrence of violations of execution limits by EJBs running on an application server of said cluster of application servers; wherein the periodically comparing comprises periodically comparing respective numbers of violations for each application server of said cluster of application servers.

13. The method of claim 12, wherein said monitoring is performed by a plurality of monitoring programs, each of said plurality of monitoring programs running on an application server of said cluster of application servers.

14. The method of claim 12, wherein said monitoring further comprises determining an average time said plurality of selected EJBs spend in each application server of said cluster of application servers.

15. The method of claim 12, further comprising sending a message to a console, noting that an additional server should be added to said cluster of application servers, responsive to one of said respective weighting values reaching a maximum value.

16. A computer program product stored in a computer-readable storage medium for managing a cluster of application servers configured to run EJBs, said computer program product comprising instructions operable by a data processing system for performing the steps of:
   dividing a workload of EJBs among application servers of said cluster of application servers according to respective weighting values associated with said application servers of said cluster of application servers;
   monitoring a plurality of selected EJBs on said cluster of application servers and recording selected execution information for respective application servers of said cluster of application servers, wherein said monitoring comprises dynamically inserting monitors within each of said plurality of selected EJBs to monitor real-time performance of said selected EJBs;
   periodically comparing said selected execution information for said respective application servers of said cluster of application servers;
   upon detection of a given difference between execution information for said respective application servers of said cluster of application servers, dynamically changing at least one of said respective weighting values; and monitoring an occurrence of violations of execution limits by EJBs running on an application server of said cluster of application servers; wherein the periodically comparing comprises periodically comparing respective numbers of violations for each application server of said cluster of application servers.

17. The computer program product of claim 16, wherein said monitoring is performed by a plurality of monitoring programs, each of said plurality of monitoring programs running on an application server of said cluster of application servers.

18. The computer program product of claim 16, wherein said monitoring further comprises determining an average time said plurality of selected EJBs spend in each application server of said cluster of application servers.

19. The computer program product of claim 16, further comprising sending a message to a console, noting that an additional server should be added to said cluster of application servers, responsive to one of said respective weighting values reaching a maximum value.

* * * * *